(12) United States Patent
Börner et al.

(10) Patent No.: US 6,170,128 B1
(45) Date of Patent: Jan. 9, 2001

(54) CONNECTOR FOR CONVEYOR BELTS

(75) Inventors: Gerhard Börner, Wiesbaden;
Wolfgang Herold, Offenbach, both of (DE)

(73) Assignee: MATO Maschinen-und Metallwarenfabrik Curt Matthaei GmbH & Co. KG, Offenbach (DE)

(*) Notice: Under 35 U.S.C. 154(b), the term of this patent shall be extended for 0 days.

(21) Appl. No.: 09/305,421

(22) Filed: May 5, 1999

(30) Foreign Application Priority Data

May 11, 1998 (DE) .............................. 198 20 717

(51) Int. Cl.⁷ .................. B65G 15/00; F16G 3/02
(52) U.S. Cl. .................. 24/33 P; 24/31 R; 24/31 B; 24/31 C; 24/31 W
(58) Field of Search .................. 24/33 P, 31 B, 24/31 W, 33 C, 31 R, 33 R, 35 R

(56) References Cited

U.S. PATENT DOCUMENTS

| | | | |
|---|---|---|---|
| 2,490,195 | * 12/1949 | Beach | 24/33 P |
| 3,093,005 | * 6/1963 | Dean | 24/31 B |
| 3,737,954 | * 6/1973 | Tabler | 24/31 C |
| 4,315,349 | * 2/1982 | Stolz | 24/33 P |
| 4,558,492 | * 12/1985 | Hite et al. | 24/31 B |
| 4,671,403 | * 6/1987 | Schick | 24/33 P |
| 5,236,079 | * 8/1993 | Herold | 24/31 B |
| 5,341,545 | 8/1994 | Herold . | |

FOREIGN PATENT DOCUMENTS

| | | |
|---|---|---|
| 826723 | 1/1952 | (DE) . |
| 3709594C1 | 7/1988 | (DE) . |
| 4235759A1 | 5/1994 | (DE) . |

* cited by examiner

*Primary Examiner*—Victor N. Sakran
(74) *Attorney, Agent, or Firm*—Price, Heneveld, Cooper, DeWitt & Litton

(57) ABSTRACT

This invention relates to a connection for two ends (2,4) of a conveyor belt (1), comprising connection elements (6) which are attached by means of fixing elements (7) to the conveyor belt ends (2, 3). A covering (17), which covers the connection elements (6) and the fixing elements (7) thereof, is disposed on at least one face of the conveyor belt (1). A fastener (21) for the covering (17) cooperates with the connection elements (6). In order to create a connection which is distinguished by its particularly prolonged durability, the invention essentially proposes that the respective fastener (21) is attached to one or both limbs (11) of the connection element of U-shaped form, or to a plate or to plates which are disposed on both faces of the conveyor belt and which rigidly connect the conveyor belt ends. (FIG. 2).

41 Claims, 6 Drawing Sheets

CONNECTOR FOR CONVEYOR BELTS

BACKGROUND OF THE INVENTION

This invention relates to the connection of two ends of a conveyor belt, comprising connection elements which are attached by means of fixing elements to the conveyor belt ends, wherein a covering is disposed on at least one face of the conveyor belt and covers the connection elements and the fixing elements of the connection elements which are disposed on this face, and wherein holding means which cooperate with the connection elements are provided for the covering.

A connection of this type for two ends of a conveyor belt is known from DE 37 09 594 C1. The covering there is attached to the connection elements in the intermediate space between the two ends of the conveyor belt. The result is that the covering covers the ends of the conveyor belt whilst protruding forwards and backwards in the direction of conveying. In particular, this covering is of resilient, preferably of elastic construction, and consists of steel and/or of plastics. When the covering is installed according to one specific embodiment, a coupling element which is constructed as a rod passes through the overlapping ends of connection elements which are connected to different conveyor belt ends and passes through the holding means of the covering. The covering is thus swivel-mounted on the rod. In another specific embodiment the covering is fixed at a distance from the rod. The covering comprises holding elements at a distance from the rod, which are provided with holes through which holding rods pass. These holding rods fit behind the mutually facing limbs of the connection elements.

A connection of this type for two ends of a conveyor belt is distinguished only by its inadequate durability. This applies in particular if heavy or irregularly shaped materials or objects, particularly coal, ores, etc. are to be conveyed by means of the conveyor belt. Broken-off parts of the materials to be conveyed and/or small particles which are formed when the materials move in relation to each other penetrate beneath the covering, so that the latter protrudes in relation to the material being conveyed. This thus results in increased wear of the covering and ultimately of the connection and fixing elements. There is a risk of the covering breaking down and of individual connection elements suddenly breaking, so that the material being conveyed can thus no longer be conveyed reliably. In particular, if a stripping device is provided which projects into the path of the material being conveyed and diverts the latter from the conveyor belt, there is a particularly pronounced relative movement between the material being conveyed and the conveyor belt, which relative movement also occurs in the region of the covering and of the connection and fixing elements. This results in the connection between the ends of the conveyor belt being subjected to an even higher degree of wear. A repair for the purpose of installing new connection elements at the belt ends and of installing a new covering consumes a considerable amount of time, with the consequences of a stoppage of the conveyor belt and of reduced economic efficiency.

When the conveyor belt moves over a deflection roller an increase in noise emission is observed, since the metal connection and fixing elements are passed over deflection rollers which are generally made of metal. Due to its weight, the material which is conveyed on the conveyor belt thereby presses the connection and fixing elements against the deflection roller with a considerable force.

A protective cap for conveyor belt connectors, which consists of rubber or of an equivalent flexible material, is known from DE-PS 826 723. The protective cap penetrates the spaces between the connection elements in the region between the two conveyor belt ends and is joined to a rod-shaped installation element. The protective cap extends in the manner of a bead slightly above the conveyor belt level with respect to the top and bottom faces thereof.

The connection of two ends of a conveyor belt in the form of a hinged joint or in the form of a hingeless connection is known from DE 42 35 759 A1 for example. The connection element there is of U-shaped construction, and connection elements which are attached to different conveyor belt ends are either joined in the region of their U-shaped loop by means of a coupling element, or each connection element comprises a rigid plate.

SUMMARY OF THE INVENTION

The object of the present invention is further to develop a connection of the type cited at the outset so that it is distinguished by its particularly long durability. The object is also to achieve a reduced emission of noise for a connection such as this.

This object is achieved for a connection for two ends of a conveyor belt of the type cited at the outset in that the respective connection element is of U-shaped construction, and connection elements which are attached to different conveyor belt ends are connected in the region of their U-shaped loop by means of a coupling element, or in that the respective connection element comprises a rigid plate, wherein the respective holding means is attached to one or both limbs of the U-shaped connection element or to the plate or to plates disposed on both faces of the conveyor belt.

Provision is thus made according to the invention for the holding means for the covering to be directly attached to the connection elements. Thus, when the material being conveyed acts on the covering above the latter, there are no forces which are transmitted into coupling elements or the like which pass through the connection elements which mesh with each other. Instead, the holding means constitute a rigid connection between the covering and the connection elements. According to one particular embodiment, the respective holding means is screwed to the connection element or is inserted through the latter, and in particular is screwed into or passed through a hole in the limb or in the plate, which hole is suitable for receiving the fixing element. In principle, very different components can be used as holding means for the covering, for example nails, pins or staples. However, screws are considered to be particularly advantageous fixing means, especially those screws which are of self-tapping construction. In order to be able to position the covering layer in as simple a manner as possible with respect to the conveyor belt ends and the connection elements, the covering should have a plurality of alignment holes which are aligned with holes in the connection elements. Alignment is effected by inserting a pin in the respective alignment hole and in the hole in the connection element which is associated therewith.

The covering itself can be of different forms. Since it is subject to wear, it should advisedly be replaceable. This can be achieved particularly simply and rapidly by fixing the covering by means of screws. It is also possible to incorporate the covering in a cast part which in particular is installed together with the connection and fixing elements.

In the sense of the present invention, it is sufficient if the covering is disposed on that face of the belt which faces the material being conveyed. One particular embodiment of the invention provides for the covering also to be provided on the face facing away from the material being conveyed. It is thus impossible for the metal connection and fixing elements to contact the deflection rollers in the region of the deflection rollers. Instead of this, the covering is passed around the deflection roller with reduced noise. This is also associated with a reduction in wear of the elements.

A design which is fundamentally different provides for the holding means to be constructed as a projection which is inserted in a complementary recess in the covering. A particularly simple form of the projection results if the latter is of plate-like construction. The holding means preferably forms a constructional unit with the connection element. It is thus unnecessary for the holding means to be installed in a separate operation. In particular, the holding means is constructed as a projection, preferably as a plate-like projection, which is attached to the limbs of the connection element or which is attached to the plate if a hingeless connection is formed. When the holding means is constructed as a projection, it is possible in particular for the covering to be slid on to the projection. In particular, sliding is effected perpendicular to the direction of travel of the conveyor belt in the conveying plane thereof. If the conveyor belt is outwardly curved, it is also possible to fit the covering substantially radially on to the holding means.

One possible design provides for the ends of the conveyor belt to be of a reduced thickness and for the covering to be disposed in the recess of the conveyor belt which is thus formed. In the ideal situation, the surface with which the material being conveyed comes into contact forms a plane with the surface of the conveyor belt.

For example, if the conveyor belt is designed as a single-layer textile conveyor belt which is provided with a top and bottom covering sheet made of rubber, the top covering sheet can be removed in order to receive the covering. The covering can be pushed into or inserted in a dovetail-like transverse recess in the conveyor belt. If the ends of the conveyor belt are not of reduced thickness, the covering which is placed on the conveyor belt ends should be of reduced thickness at the front and back with respect to the direction of travel of the conveyor belt.

The covering preferably consists of an elastomer, particularly rubber or polyurethane, or of polyvinyl chloride or of a composite of an elastomer and metal. The composite part may have a central rubber section, for example, which is adjoined by metal sections at the front and back in the direction of conveying. According to one fundamentally different design, the covering forms a cast unit with the connection elements. As a consequence of this, the connection elements are installed together with the covering. The casting material is preferably an elastomer. The cast unit may comprise a textile reinforcement, for example.

The covering may either extend over the entire width of the conveyor belt or may be formed from individual segments which are disposed side-by-side. In particular, the covering is constructed as individual segments if the conveyor belt is moved over rollers comprising a recessed zone.

Other features of the invention are illustrated in the subsidiary claims, in the description of the figures and in the figures themselves, wherein it should be remarked that all the individual features and all combinations of individual features are an essential part of the present invention.

BRIEF DESCRIPTION OF THE DRAWINGS

The invention is illustrated by way of example in the figures with reference to various embodiments, without being restricted thereto. The figures are as follows.

DETAILED DESCRIPTION OF PREFERRED EMBODIMENTS

Figure 1:
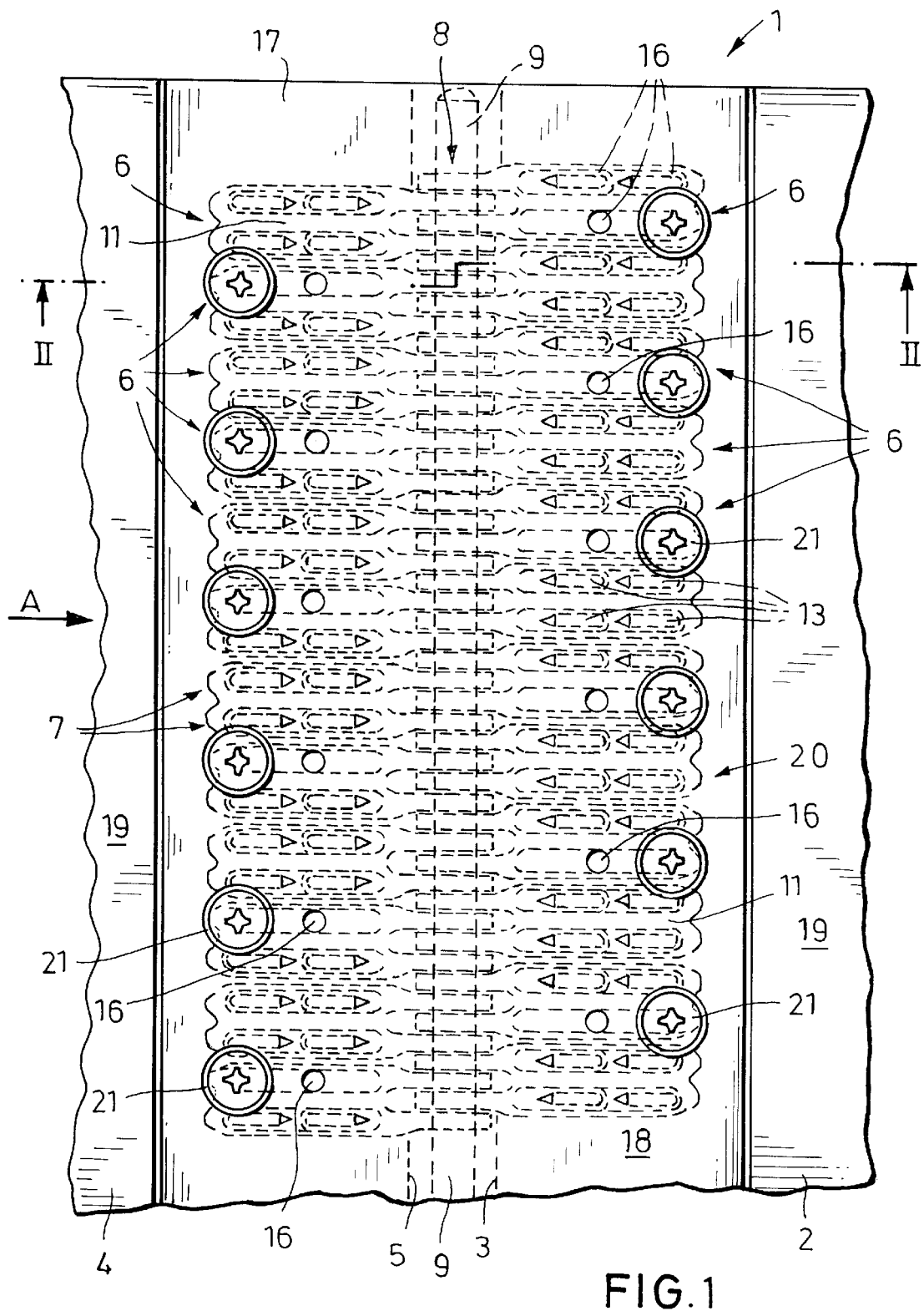
FIG. 1 is a plan view of half of a conveyor belt which is fashioned with a hinged connection and with the covering according to the invention, in the region of the two conveyor belt ends.
Figure 2:
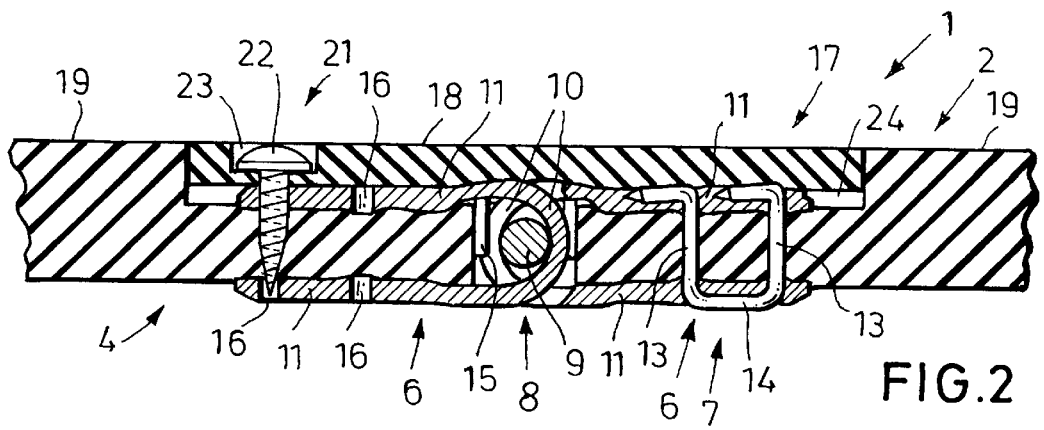
FIG. 2 is a section through the connection between the two ends of the conveyor belt and through the covering, along line II—II in FIG. 1.

FIGS. 1 and 2 show the hinged connection of two ends of a conveyor belt 1. The latter is driven in the direction of arrow A. The front conveyor belt section 2 with respect to the direction of travel A is delimited at the back by the edge 3, and the rear conveyor belt section 4 is delimited by the front edge 5. There is a multiplicity of connection elements which are attached by means of staples 7 to the conveyor belt sections 2 and 4 in the region of the front and rear edges 5, 3 thereof, as is disclosed in the prior art according to DE 42 35 957 A1 for example.

Each connection element 6 comprises an arcuate loop crosspiece 10 and two limbs 11 for the formation of a loop 8 for a coupling rod 9, wherein each limb 11 is provided with four holes 16 for receiving the limbs 13 of two staples 7. The conveyor belt 1 is constructed as a single-layer textile conveyor belt and comprises top and bottom covering sheets made of rubber, which are not illustrated. In the embodiment shown in FIGS. 1 and 2, the top covering sheet has been removed, by shaving it off for example, in the region of the respective belt end. The U-shaped connection elements 6 have been pushed on to the belt ends in this diminished region and are attached by means of the staples 7 to the conveyor belt sections 2 and 4. Projections 15, which are provided on the connection elements and which make contact with the end face of the respective conveyor belt section 2 or 4, serve as limit stops when the connection elements 6 are installed. The individual connection elements 6 of a conveyor belt section are fixed to each other by means of a rod which is not shown but which is disposed in the region of the projection 15 and is oriented perpendicularly to the direction of travel of the belt, so that these connection elements can be fitted as a unit to the respective conveyor belt section 2 or 4. The respective staple 7 is introduced from the face of the conveyor belt 1 into the associated connection element 6 which is remote from the covering sheet which has been removed. After driving in the staples 7, the free end regions of the staple limbs 13 are bent off at right angles behind the associated limb 11 of the connection element 6 and thus clamp the respective conveyor belt section between the limbs 11 of the connection element 6. On account of the course of the section shown in FIG. 2, only the staple 7 of the leading connection element 6 in the direction of travel is visible, and the staple of the trailing connection element is not visible. As can be seen from the regions on the left of FIG. 2 and of FIG. 1, not all the holes 16 in the connection elements 6 are used for receiving staples 7, but the four holes which are usually employed for receiving a staple 7 remain free in each second connection element 6.

FIGS. 1 and 2 show that a sheet-like rectangular covering 17 is inserted in the region of the removed top covering sheet, the thickness of which covering when it rests on the connection elements 6 is designed so that its upper face 18 is in alignment with the upper faces 19 of the conveyor belt sections 3 and 4. The dimension of the covering 17 in the direction of conveying of the belt is selected so that it can be inserted with a slight clearance in the recess 24 of the conveyor belt 1. The covering 17 can extend over the entire width of the conveyor belt or can be formed from individual segments which extend over only part of the width of the conveyor belt and which are disposed at a defined spacing from each other, so that the belt can be moved in particular through a recessed zone of a conveyor roller. Twelve screws 21, which serve to attach the covering 17 to the connection elements 6, are provided for the connector strip shown in FIG. 1, which consists of twelve mutually meshing connection elements 6. The screws 21 are self-tapping, so that they can be screwed directly into the respective, mutually aligned holes 16 in the limbs 11 of the connection elements 6. A countersunk region 23 in the covering 17 is provided for the screw head 22. On account of the course of the section selected in FIG. 1, FIG. 2 only shows the connection of the covering 17 to the rear conveyor belt section 4. The covering may consist of rubber for example.

In the embodiment shown in FIG. 1, a rigid connection is produced on account of the circumstance that the respective screw 21 passes through both limbs 11 of the associated connection element 6. This assumes that the covering layer is quite flexible so that it can deform when the conveyor belt 1 is in operation. The embodiment shown in FIG. 2 differs from that shown in FIG. 1 in that the respective screw 21 is only screwed into the limb 11 of the respective connection element 6 facing the covering 17, and a sufficiently large gap 25 is formed in the recess 24 of the conveyor belt 1, in front of and behind the covering 17 with respect to the direction of travel of the belt, so that in this case the covering 17 can be of stiffer construction.

Figure 4:
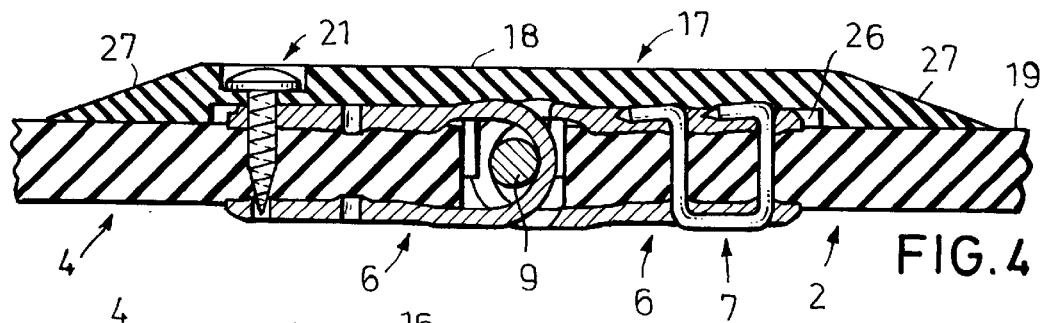

The embodiment shown in FIG. 4 exhibits basic similarities to that shown in FIG. 2. The covering layer of the conveyor belt 1 is not removed, however, so that the belt has no recess 24. The covering 17 made of rubber is placed directly on the upper face 19 of the conveyor belt sections 2 and 4 and in the central section of its face which faces the conveyor belt 1 it has a recess 26 which serves to receive the upper limbs 11 of the connection elements 6. The covering 17 is provided with a bevel 27 at the front and at the back with respect to the direction of travel, so that any material being conveyed which moves in relation to the conveyor belt 1 cannot become caught on a sudden edge of the covering 17.

Figure 5:
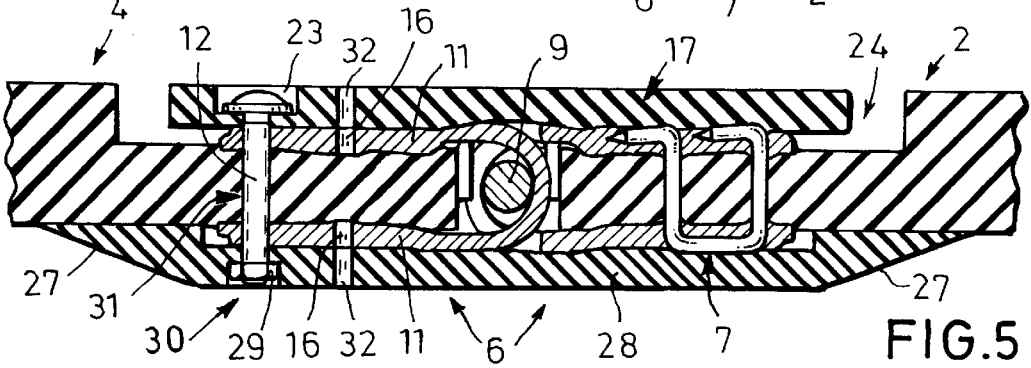

The embodiment shown in FIG. 5 differs from that shown in FIG. 4 in that nut and bolt connections 31 are provided here for fixing the covering 17 instead of screws 21. A bolt 12 is inserted from above into the respective countersunk region 23, through the hole in the covering 17 and through the holes 16 in the limbs 11 of the associated connection element 6, and passes through a hole in a bottom covering 28, the countersunk region 29 of which receives the nut 30. Thus in this embodiment a bottom covering 28 is also used. This bottom covering is fashioned corresponding to the covering 17 in the embodiment shown in FIG. 4, and due to its bevels 27 ensures that the conveyor belt 1 can pass over a deflection roller which contacts the lower face of the conveyor belt 1 with a reduced noise level. Apart from this, the deflection rollers or running rollers of the conveying system are protected due to the bottom covering 28, since they do not come into contact with the metal connection elements and with the means which are used for the fixing thereof. In addition, the two coverings 17 and 28 are provided with holes 32, which serve to simplify the positioning of the coverings. For this purpose, a mounting pin, which is not shown, is inserted through the mutually aligned holes 32 and 16.

Figure 6:
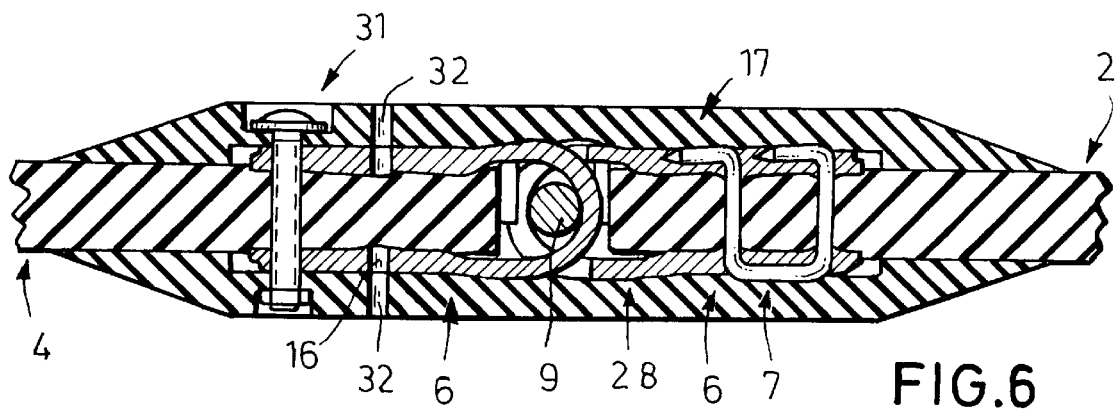

The embodiment shown in FIG. 6 differs from that shown in FIG. 5 in that the top covering 17 is not disposed in a recess, but instead of this is of corresponding construction to the bottom covering 28.

Figure 7:
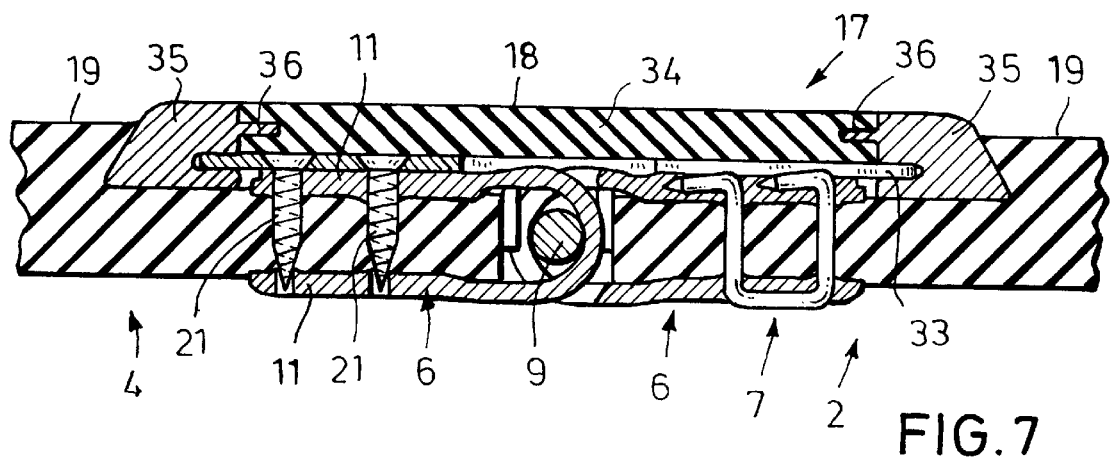

The embodiment shown in FIG. 7 is similar to that shown in FIG. 1. Here, an additional metal plate 33 is employed for fixing the covering 17, which is inserted from the face into the recess 24, which in this case is a dovetail-like recess. The metal plate 33, which projects beyond the connection elements 6 at the front and the back with respect to the direction of travel, is placed on the connection elements 6 which are fixed to the conveyor belt sections 2 and 4. The metal plate 33 contains holes, wherein two screws 21, which pass through the two limbs 11 of the associated connection element 6, are employed at each connection point for fixing the metal plate 33 to the connection element 6. The covering 17 is constructed as a composite part. It consists of a central sheet-like section 34 made of rubber, the front and rear end faces of which are attached to wedge-shaped sections 35 made of metal, which are formed corresponding to the shape of the dovetail, wherein tongues 36 which are attached to the sections 35 protrude into grooves in the sheet-like section 34. The upper face 18 of the covering 17 protrudes slightly above the upper faces 19 of the two conveyor belt sections 2 and 4.

Figure 8:
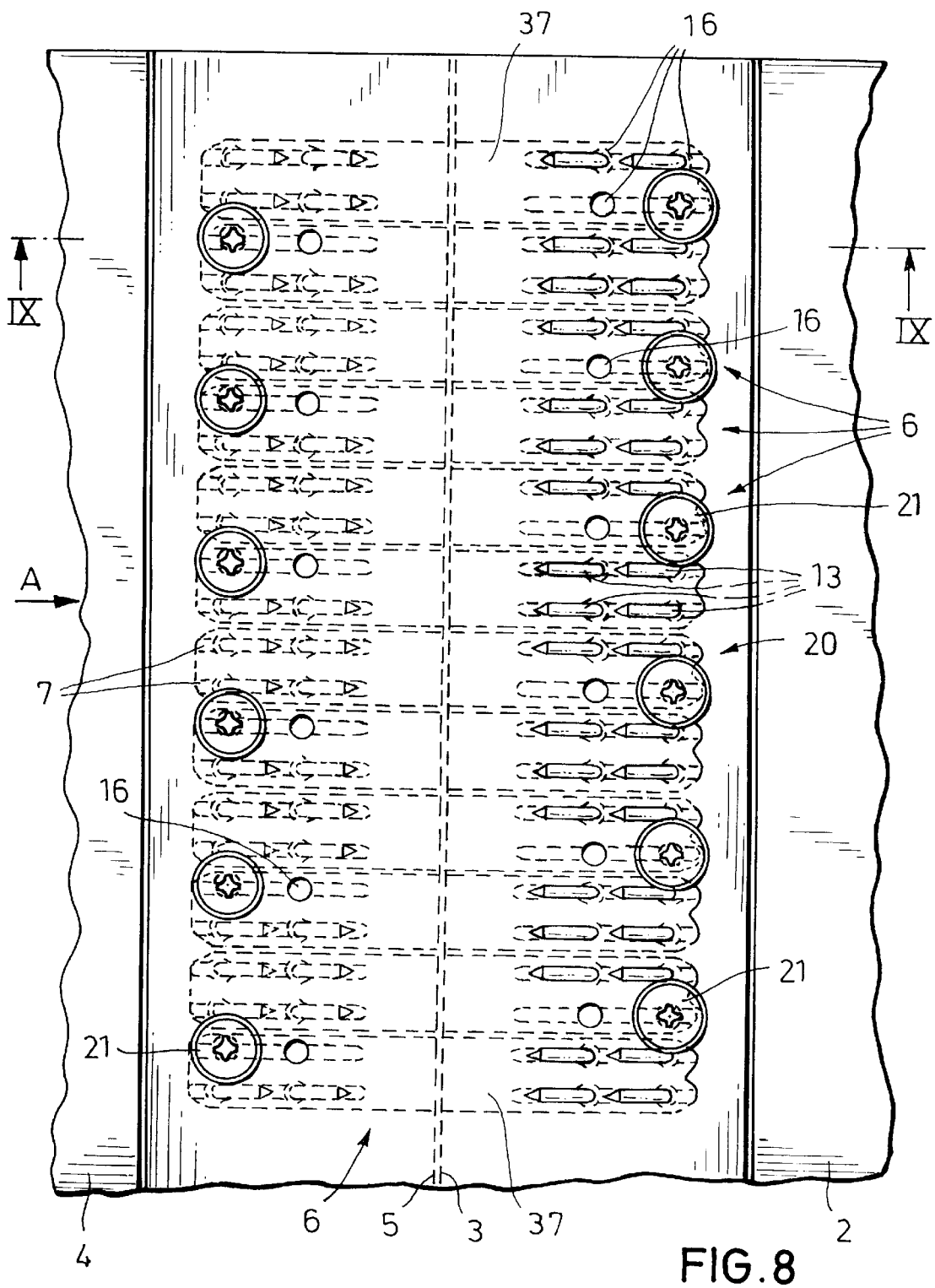
FIG. 8 is a plan view of a hingeless connection between two ends of a conveyor belt and the covering thereof for the region shown in FIG. 1.
Figure 9:
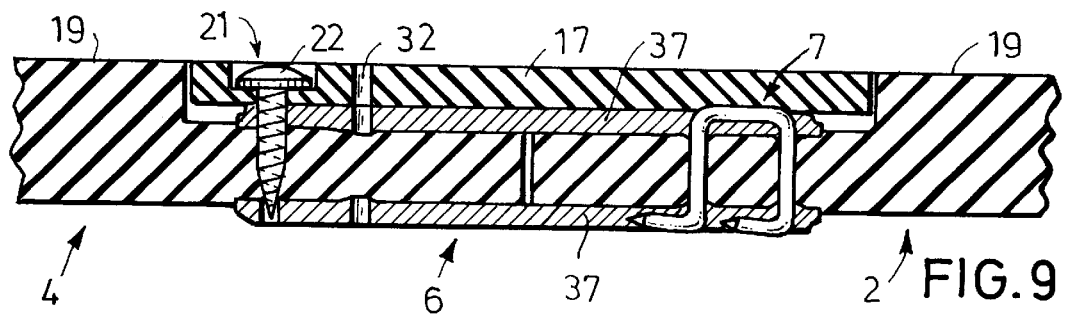
FIG. 9 is a section through the connection and the covering along line IX—IX in FIG. 8.

The embodiment shown in FIGS. 8 and 9 comprises a hingeless connection of the two conveyor belt sections 2 and 4. Connection elements 6 are used here which comprise rigid plates 37 which are oriented in the direction of conveying of the belt 1. In order to receive four staples 7 in each case, each plate 37 which is attached to the upper face of the conveyor belt 1 is provided with four holes 16 and each lower plate 37 is correspondingly provided with four holes 16. Parts which perform a function corresponding to the parts of the embodiment shown in FIGS. 1 and 2 are denoted by the same reference numerals in FIGS. 8 and 9 and in subsequent figures.

Figure 3:
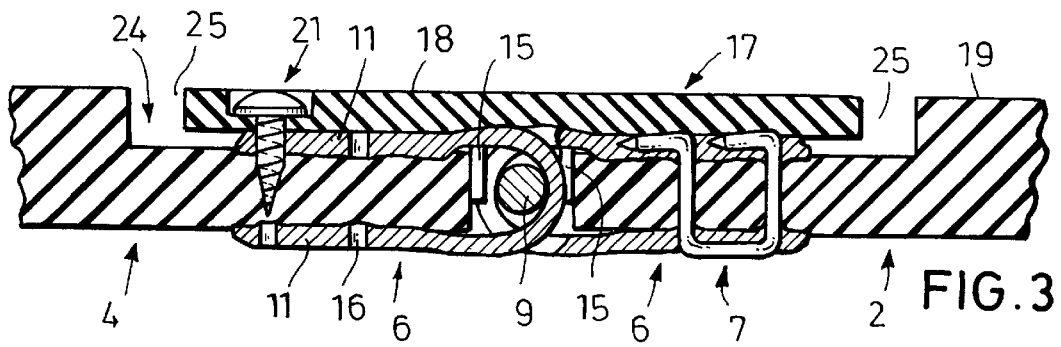
FIGS. 3 to 7 show different forms of the connection and of the covering, in a sectional view corresponding to that of FIG. 2.
Figure 10:
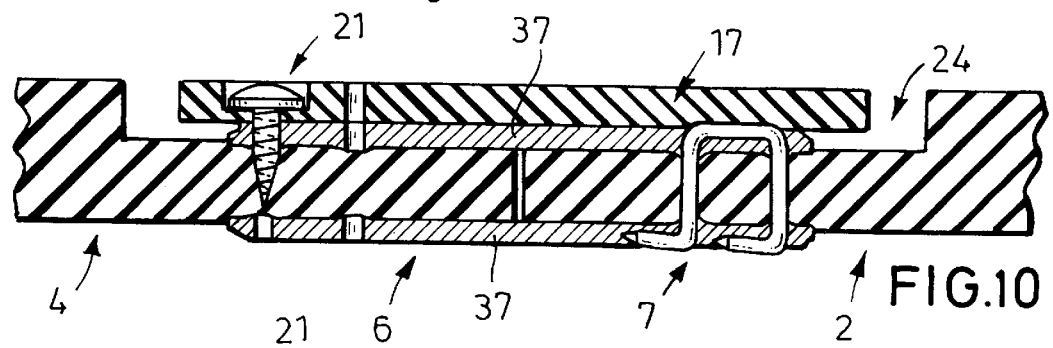
FIGS. 10 to 18 show different forms of the hingeless connection and of the covering, as sectional views corresponding to the illustration in FIG. 9.
Figure 11:
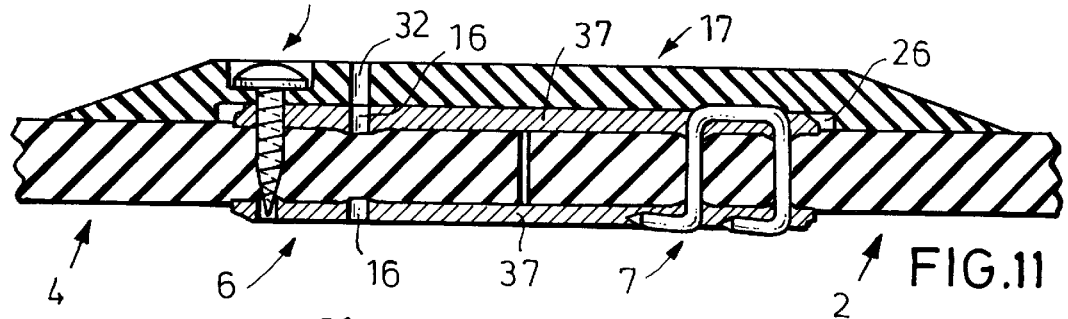
Figure 12:
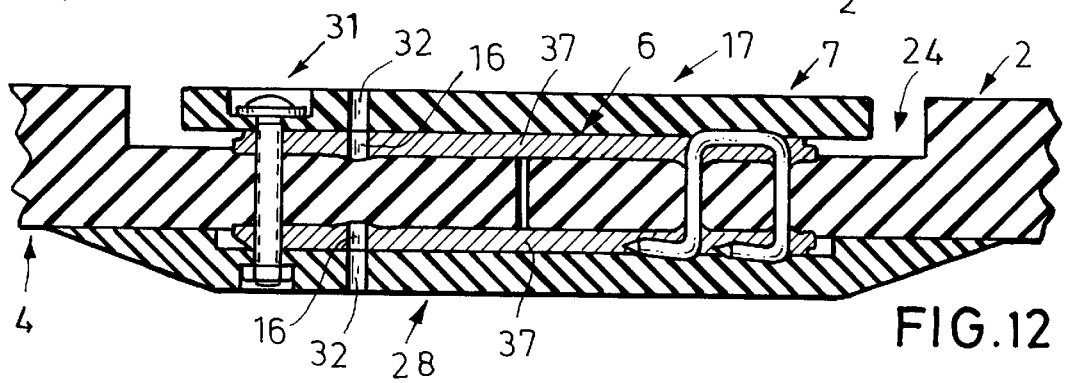
Figure 13:
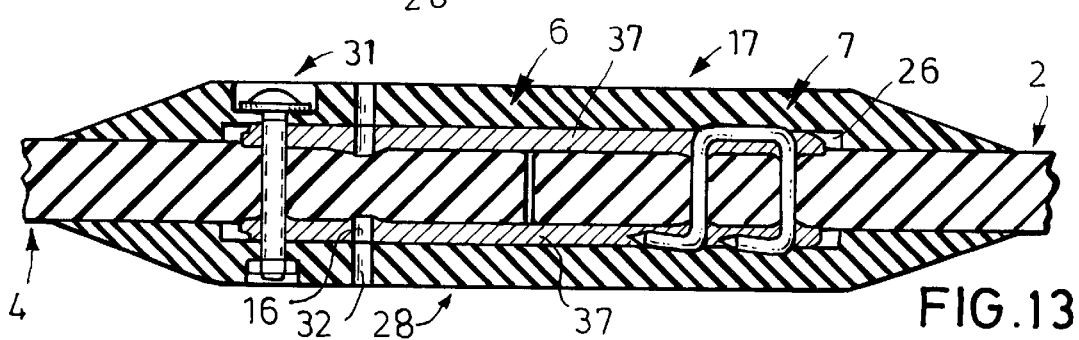
Figure 14:
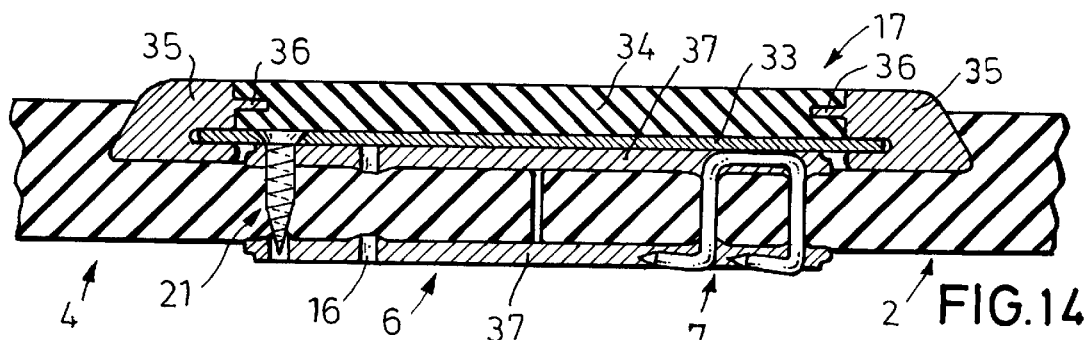

Apart from the difference of the hingeless connection, the embodiment shown in FIG. 9 corresponds to that shown in FIG. 2. However, the staples 7 have not been driven in from below but have been driven in from above, and the top covering 17 is provided in addition with the positioning holes 32. The embodiment shown in FIG. 10 comprises a hingeless connection, but otherwise constitutes a variant which corresponds to the embodiment shown in FIG. 3. With respect to the hingeless connection, FIG. 11 constitutes a variant which is comparable with that of FIG. 4, FIG. 12 constitutes a variant comparable with that of FIG. 5, FIG. 13 constitutes a variant comparable with that of FIG. 6, and FIG. 14 constitutes a variant comparable with that of FIG. 7, wherein in the embodiment shown in FIG. 14 only one screw 21 is used each time instead of two screws 21. The embodiment shown in FIG. 15 differs from that shown in FIG. 14 in that the covering 17 does not constitute a composite component but consists of one material, for example rubber, polyurethane or another similar elastomer, or may optionally consist of polyvinyl chloride also.

Figure 15:
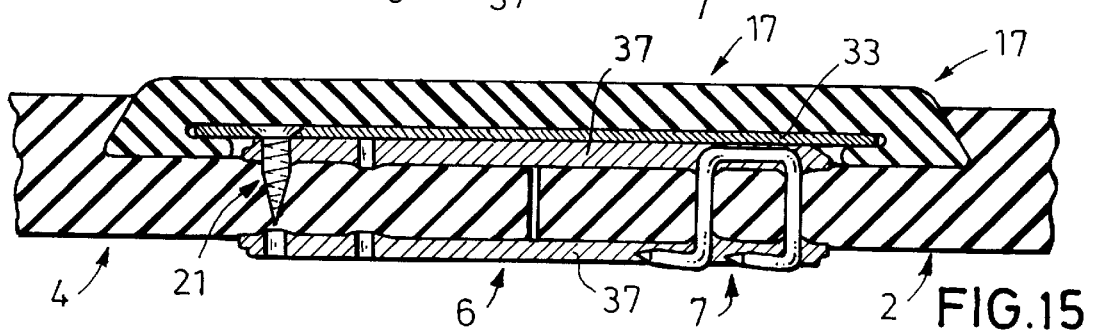
Figure 16:
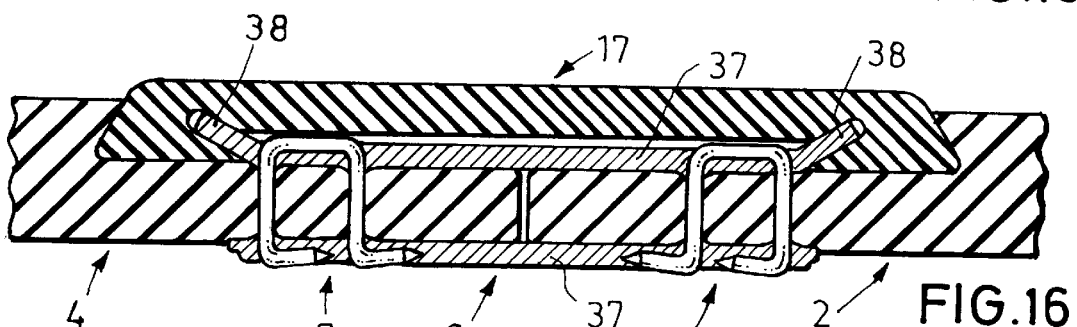

The embodiment shown in FIG. 16 differs from that shown in FIG. 15 in that a metal plate 33 which is attached to the upper rigid plate 33 is not provided, but that the rigid plate 37 is modified by providing it with projections 38 which are directed obliquely upwards in the region of its front and rear ends with respect to the direction of travel of the conveyor belt 1, which projections function as holding means in this case. It is therefore unnecessary to provide holding means in the form of the screws 21 or in the form of the nut and bolt connection 31, optionally in combination with the separate metal plate 33. The rigid plate 37 comprising the projections 38 is provided with holes corresponding to those in the lower plate 37 and the two plates 37 are joined by means of four staples 7, and they clamp the conveyor belt sections 3 and 4 between them in the region of reduced thickness of the conveyor belt 1. The covering 17 is preferably inserted transversely to the direction of travel of the conveyor belt 1 into the dovetail-like recess 24 which is formed.

Figure 17:
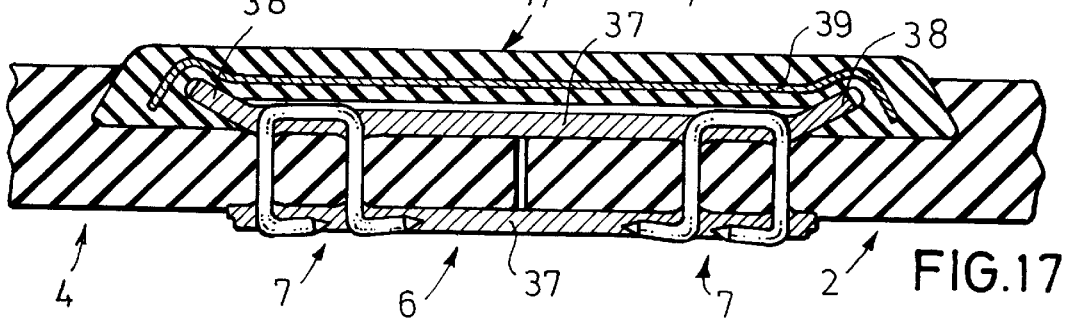

The embodiment shown in FIG. 17 differs from that shown in FIG. 16 in that a reinforcement 39 is inserted in the covering 17. This reinforcement is constructed in particularly as a metal or textile reinforcement. Specifically, a thin-walled reinforcing element made of metal is provided here, the middle region of which extends parallel to the plate 37 and the end regions of which are bent around the projections 38. The effect of these end regions inside the covering 17, which consists of rubber, is that the wedge-shaped ends of the covering are held under spring pressure in the dovetail-like corner regions of the recess 24.

Figure 18:
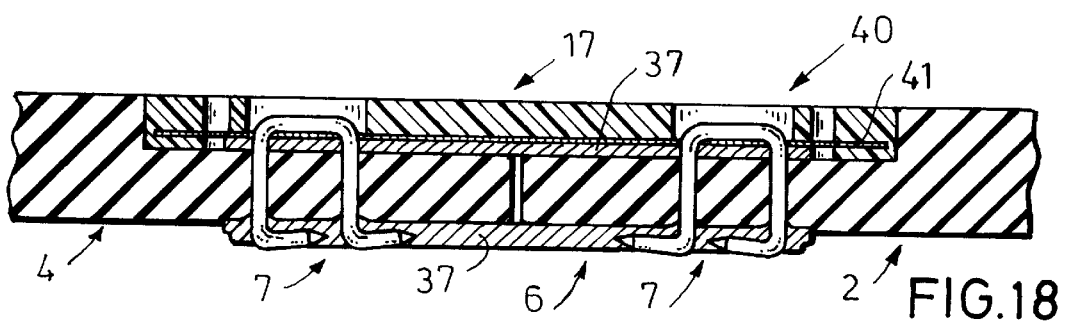

The embodiment shown in FIG. 18 basically differs from the embodiments described above in that the covering 17, together with the holding means, forms a cast unit 40. The casting material is preferably an elastomer. The cast unit comprises the plate 37, which is provided on its underside with ribs of low height which are not illustrated in the figure. A textile section 41, which extends above the plate 37 at the front and back with respect to the direction of travel of the conveyor belt 1, is placed on the plate 37. The parts are cast with each other, wherein the casting material completely surrounds them and thus penetrates under the plate 37 also, on account of the ribs. Casting technology measures are employed which ensure that the holes in the plate 37 and in the textile section 41 which serve to receive the staples remain free. The casting material is cast to a height such that it has the contour of a right parallelepiped and can be inserted in the parallelepiped-shaped recess 24 in the conveyor belt 1. This is followed by the attachment of the cast unit 40 by means of the staples 7, wherein the ends of the latter are bent around behind the plate 37 which is mounted on the lower face of the conveyor belt sections 2 and 4.

The invention claimed is as follows:

1. A connector for conveyor belts of the type having opposite faces, a predetermined width and opposite ends to be interconnected, comprising:

a plurality of connection elements having opposite limbs shaped for mounting on the opposite ends of the conveyor belt, and U-shaped loops shaped to mesh with one another;

a plurality of fixing elements attaching said limbs of said connection elements to the opposite ends of the conveyor belt;

a coupling rod extending between the loops of oppositely oriented, meshed ones of said connection elements to hingedly interconnect the same;

a separable covering positioned over at least one of the faces of the conveyor belt, and extending across said predetermined width to cover each of said connection elements and said fixing elements disposed on said one conveyor belt face; and a fastener detachably connecting said covering to said limbs of said connection elements disposed on said one face of said conveyor belt.

2. A connector as set forth in claim 1, wherein:

said covering is disposed on both of the faces of the conveyor belt, and covers all of said connection elements and said fixing elements disposed on both faces of the conveyor belt.

3. A connector as set forth in claim 2, wherein:

said limbs of said connection elements include fastener apertures; and said fasteners engage the fastener apertures in said limbs.

4. A connector as set forth in claim 3, wherein:

said fastener apertures are also shaped to receive said fixing elements therethrough.

5. A connector as set forth in claim 4, wherein:

said covering includes alignment apertures aligned with the fastener apertures in said limbs.

6. A connector as set forth in claim 1, wherein:

said fastener comprises a projection on said connection elements which is received in a mating recess in said covering.

7. A connector as set forth in claim 6, wherein:

said projection comprises a plate-shaped projection on said limb.

8. A connector as set forth in claim 7, wherein:

said covering is shaped to be received in a recess in the conveyor belt formed by belt end areas of reduced thickness.

9. A connector as set forth in claim 8, wherein:

said covering is shaped to be engaged by said fastener by lateral insertion of the same relative to the direction of travel of the conveyor belt.

10. A connector as set forth in claim 9, wherein:

said covering has opposite ends of reduced thickness in the direction of travel of the conveyor belt, shaped to overlie areas of unreduced thickness on the conveyor belt.

11. A connector as set forth in claim 10, wherein:

said connector is adapted for multi-layer conveyor belts of the type having top and bottom covering sheets made of rubber.

12. A connector as set forth in claim 11, wherein:

said covering is constructed from an elastomeric material.

13. A connector as set forth in claim 12, wherein:

said covering comprises a textile reinforcement.

14. A connector as set forth in claim 13, wherein:

said covering is defined by a plurality of individual covering segments disposed side-by-side.

15. A connector as set forth in claim 1, wherein:

said limbs of said connection elements include fastener apertures; and said fasteners engage the fastener apertures in said limbs.

16. A connector as set forth in claim 15, wherein:

said fastener apertures are also shaped to receive said fixing elements therethrough.

17. A connector as set forth in claim 1, wherein:

said covering has opposite ends of reduced thickness in the direction of travel of the conveyor belt, shaped to overlie areas of unreduced thickness on the conveyor belt.

18. A connector as set forth in claim 17, wherein:
said covering is defined by a plurality of individual covering segments disposed side-by-side.

19. A connector as set forth in claim 1, wherein:
said fastener comprises a projection on said connection plates which is received in a mating recess in said covering.

20. A connector as set forth in claim 19, wherein:
said projection comprises a plate-shaped projection on said connection plates.

21. A connector as set forth in claim 20, wherein:
said covering is shaped to be received in a recess in the conveyor belt formed by belt end areas of reduced thickness.

22. A connector as set forth in claim 21, wherein:
said covering is shaped to be engaged by said fastener by lateral insertion of the same relative to the direction of travel of the conveyor belt.

23. A connector as set forth in claim 22, wherein:
said covering has opposite ends of reduced thickness in the direction of travel of the conveyor belt, shaped to overlie areas of unreduced thickness on the conveyor belt.

24. A connector as set forth in claim 23, wherein:
said connector is adapted for multi-layer conveyor belts of the type having top and bottom covering sheets made of rubber.

25. A connector as set forth in claim 24, wherein:
said covering is constructed from an elastomeric material.

26. A connector as set forth in claim 25, wherein:
said cast covering is constructed from an elastomeric material.

27. A connector as set forth in claim 26, wherein:
said covering comprises a textile reinforcement.

28. A connector as set forth in claim 27, wherein:
said covering is defined by a plurality of individual covering segments disposed side-by-side.

29. A connector for conveyor belts of the type having opposite faces, a predetermined width and opposite ends to be interconnected, comprising:
a pair of rigid connection plates shaped for mounting on the opposite ends of the conveyor belt in oppositely facing juxtaposition on the opposite faces of the conveyor belt;
a plurality of fixing elements attaching said connection plates to the opposite ends of the conveyor belt;
a separable covering positioned over at least one of the faces of the conveyor belt, and extending across said predetermined width to cover said one of said connection plates disposed on said one conveyor belt face, and each of said fixing elements disposed on said one conveyor belt face; and
fasteners detachably connecting said covering to said one of said connection plates.

30. A connector as set forth in claim 29, wherein:
said covering is disposed on both of the faces of the conveyor belt, and covers all of said connection elements and said fixing elements disposed on both faces of the conveyor belt.

31. A connector as set forth in claim 30, wherein:
said connection plates include fastener apertures; and
said fasteners engage the fastener apertures in said limbs.

32. A connector as set forth in claim 31, wherein:
said fastener apertures are also shaped to receive said fixing elements therethrough.

33. A connector as set forth in claim 32, wherein:
said covering includes alignment apertures aligned with the fastener apertures in said connection plates.

34. A connector for conveyor belts of the type having opposite faces, and opposite ends to be interconnected, comprising:
a plurality of connection elements having opposite limbs shaped for mounting on the opposite ends of the conveyor belt, and U-shaped loops shaped to mesh with one another;
a plurality of fixing elements attaching said limbs of said connection elements to the opposite ends of the conveyor belt;
a coupling rod extending between the loops of oppositely oriented, meshed ones of said connection elements to hingedly interconnect the same;
a covering disposed on at least one of the faces of the conveyor belt, and covering each of said connection elements and said fixing elements disposed on said one conveyor belt face;
a fastener connecting said covering to said limbs of said connection elements disposed on said one face of said conveyor belt; and wherein
said covering is disposed on both of the faces of the conveyor belt, and covers all of said connection elements and said fixing elements disposed on both faces of the conveyor belt.

35. A connector as set forth in claim 34, wherein:
said limbs of said connection elements include fastener apertures; and
said fasteners engage the fastener apertures in said limbs.

36. A connector as set forth in claim 35, wherein:
said fastener apertures are also shaped to receive said fixing elements therethrough.

37. A connector as set forth in claim 36, wherein:
said covering includes alignment apertures aligned with the fastener apertures in said limbs.

38. A connector for conveyor belts of the type having opposite faces, and opposite ends to be interconnected, comprising:
a pair of rigid connection plates shaped for mounting on the opposite ends of the conveyor belt in oppositely facing juxtaposition on the opposite faces of the conveyor belt;
a plurality of fixing elements attaching said connection plates to the opposite ends of the conveyor belt;
a covering disposed on at least one of the faces of the conveyor belt, and covering said one of said connection plates disposed on said one conveyor belt face, and each of said fixing elements disposed on said one conveyor belt face;
fasteners connecting said covering to said one of said connection plates; and wherein
said covering is disposed on both of the faces of the conveyor belt, and covers all of said connection elements and said fixing elements disposed on both faces of the conveyor belt.

39. A connector as set forth in claim 38, wherein:
said connection plates include fastener apertures; and
said fasteners engage the fastener apertures in said limbs.

40. A connector as set forth in claim 39, wherein:
said fastener apertures are also shaped to receive said fixing elements therethrough.

41. A connector as set forth in claim 40, wherein:
said covering includes alignment apertures aligned with the fastener apertures in said connection plates.

* * * * *